United States Patent
Gollapudi

(10) Patent No.: US 8,352,820 B2
(45) Date of Patent: Jan. 8, 2013

(54) ARQ AND HARQ PROTOCOL DATA UNITS AND METHOD OF FORMATION

(75) Inventor: Sreelakshmi Gollapudi, Reading (GB)

(73) Assignee: NEC Corporation, Tokyo (JP)

( * ) Notice: Subject to any disclaimer, the term of this patent is extended or adjusted under 35 U.S.C. 154(b) by 1131 days.

(21) Appl. No.: 12/296,037

(22) PCT Filed: Apr. 2, 2007

(86) PCT No.: PCT/JP2007/057796
§ 371 (c)(1),
(2), (4) Date: Oct. 3, 2008

(87) PCT Pub. No.: WO2007/116985
PCT Pub. Date: Oct. 18, 2007

(65) Prior Publication Data
US 2009/0259908 A1 Oct. 15, 2009

(30) Foreign Application Priority Data
Apr. 4, 2006 (GB) .................................. 0606801.9

(51) Int. Cl.
*G08C 25/02* (2006.01)
*H04L 1/18* (2006.01)

(52) U.S. Cl. ....................................... 714/748; 370/470
(58) Field of Classification Search ........................ None
See application file for complete search history.

(56) References Cited

U.S. PATENT DOCUMENTS

| | | | | |
|---|---|---|---|---|
| 6,477,670 B1 * | 11/2002 | Ahmadvand | ................... | 714/712 |
| 6,643,813 B1 * | 11/2003 | Johansson et al. | ............ | 714/748 |
| 6,684,081 B2 * | 1/2004 | Sarkkinen et al. | ............ | 455/515 |
| 7,130,295 B2 * | 10/2006 | Kim et al. | ...................... | 370/349 |
| 7,400,649 B2 * | 7/2008 | Yi et al. | ........................ | 370/469 |
| 7,817,669 B2 * | 10/2010 | Pani et al. | ..................... | 370/474 |
| 8,050,247 B2 * | 11/2011 | Kim et al. | ..................... | 370/349 |

FOREIGN PATENT DOCUMENTS

| JP | 2004-289574 A | 10/2004 |
|---|---|---|
| JP | 2006-87097 A | 3/2006 |

OTHER PUBLICATIONS

3GPP TSG-RAN2 Meeting #50, Sophia Antipolis, France, Jan. 9-13, 2006.
3GPP TSG Ran WG2 #53, Mar. 27-31, 2006.

* cited by examiner

*Primary Examiner* — Steve Nguyen
(74) *Attorney, Agent, or Firm* — Sughrue Mion, PLLC

(57) ABSTRACT

The present invention provides for a method of forming at least one ARQ PDU from an ARQ service data unit (SDU), the ARQ PDU comprising a header portion and a data portion, and the method including selective addition of a Length Indicator field to the said header portion responsive to the determination of the presence in the PDU of the last bit of an ARQ SDU and if a HARQ PDU is formed of a plurality of ARQ PDUs wherein the last of the ARQ PDUs is arranged not to include an LI within its header if it is found not to be carrying the last bit of the ARQ SDU and LI will be added to all other ARQ PDUs though they are not carrying last bit of ARQ SDU.

5 Claims, 4 Drawing Sheets

ARQ AND HARQ PROTOCOL DATA UNITS AND METHOD OF FORMATION

TECHNICAL FIELD

Automated repeat request (ARQ) is a known method of error correction in which a receiver is arranged to detect errors in a transmitted message and to subsequently request retransmission of the message. A Hybrid Automated Repeat Request (HARQ) is known and can be formed from one or more ARQ Protocol Data Units (PDU) and likewise serve an error-correction purpose.

From specifications proposed within the Third Generation Partnership Project (3 GPP) for Universal Mobile Telecommunication System (UMTS), it is found that each of the ARQ and HARQ protocols lie in different physical entities, namely the Radio Network Controller (RNC) for ARQ protocols and the logical Node-B for the HARQ protocols.

It has been identified that a reduction in data transfer delays can be achieved by bringing the ARQ and HARQ protocols together into a single physical entity such as an E-Node-B, and the current 3 GPP Long Term Evolution (LTE) project is directed towards such a process. In order to successfully bring the ARQ and HARQ protocols together onto a single physical entity, it has been noted that the LTE requires new formats for the ARQ and HARQ PDUs which will provide quicker data throughput and which will also employ the available radio resources more efficiently.

Any such PDU formats will be advantageously applicable to all systems exhibiting ARQ and HARQ protocols and that lie together in a single physical entity.

DISCLOSURE OF INVENTION

While various proposals exist concerning the availability of appropriate ARQ/HARQ PDU formats according to 3 GPP standards proposals, the present invention seeks to provide for ARQ/HARQ PDU formats which serve to enhance the data throughput of known proposals such as that described in the Tdoc (R2-060076).

According to one aspect of the present invention, there is provided a method of forming at least one ARQ PDU from an ARQ Service Data Unit (SDU), the ARQ PDU comprising a header portion and a data portion, and the method including selective addition of a Length Indicator field to the said header portion and responsive to the determination of the presence in the PDU of the last bit of an ARQ SDU.

The invention is particularly advantageous in that, through rendering the presence of the LI field within the header portion responsive to a determination of whether or not the last bit of an ARQ SDU is present within the PDU, it really becomes possible to omit the LI field from the header when appropriate, and thereby reduce the header overhead thereby leaving more space for the data payload within the PDU.

Advantageously, the invention therefore effectively reduces the header overhead by incorporating the LI field into the header only when necessary and, as noted, only if the PDU is found to be carrying the last bit of the ARQ SDU.

If a plurality of ARQ PDUs from different SDUs are formed into one HARQ PDU, the LI is not included in the last ARQ PDU if it is found not to be carrying the last bit of the ARQ SDU and LI will be added to all the other ARQ PDUs even though they are not carrying the last bit of the ARQ SDU. I.e. this is an exception to the rule in the previous paragraph.

The presence of the LI field in the ARQ PDU in conjunction with Last Segment Indicator field (LSI) helps the receiver in re-assembling the ARQ SDU.

Of course, it will be appreciated that the present invention can comprise a method in which, if it is determined at the ARQ PDU is not carrying the last bit of the ARQ SDU, the method then includes a step of determining whether or not a plurality of PDUs are formed from different SDUs into a common HARQ PDU.

Advantageously, the presence of the LI field is indicated by means of a Segment and Length field of the ARQ header.

As a further feature, the method can include the step of providing only one Last Segment Indicator (LSI) per ARQ PDU.

This can prove further advantageous when compared with the current ARQ formats in which the number of LSI fields required corresponds to the number of levels of segmentation found per ARQ PDU.

Thus, as will be appreciated from the above, a modified frame format is proposed by the present invention and advantageously serves to reduce the number of bits required for the header fields.

It is envisaged that the bandwidth to be occupied in accordance with the present invention represents a reduction of 26% as compared with the current art.

According to another aspect of the present invention, there is provided an ARQ PDU frame structure comprising a header portion and a data portion, wherein the header portion is arranged for selective inclusion of a Length Indicator field in a manner responsive to determination of the presence in the ARQ PDU of the last bit of an ARQ SDU from which the ARQ PDU is formed.

As will be noted from the above, the ARQ PDU frame structure advantageously is arranged to allow for the addition of the LI if the PDU is found to be carrying the last bit of the ARQ SDU.

As an alternative, there is provided a HARQ PDU formed of a plurality of ARQ PDUs wherein the last of the ARQ PDUs is arranged not to include an LI within its header if it is found not to be carrying the last bit of the ARQ SDU and LI will be added to all the other ARQ PDUs even though they are not carrying the last bit of the ARQ SDU.

The presence of the LI field in the ARQ PDU in conjunction with Last Segment Indicator filed (LSI) helps the receiver in re-assembling the ARQ SDU.

The invention is described further hereinafter, by way of example only, with reference to the accompanying drawings, in which:

BEST MODE FOR CARRYING OUT THE INVENTION

Within the 3GPP standardisation of the LTE project, consideration has been given to ARQ and HARQ frame formats. However, such considerations are limited in their treatment of data throughput.

The present invention seeks to address such limitations by improving data throughput and, to achieve such an improvement, the present invention seeks to reduce the space required by header information so as to leave a greater amount of space for the data payload within each PDU.

The principal concept within the present invention is to control the inclusion of the LI header field responsive to determination of the presence of the last bit of an ARQ SDU within the PDU at issue.

Through making the presence of the LI header field available in this manner, it is found that the LI header field is then included in the header only when necessary, rather than being included in a blanket fashion within all headers.

Figure 1:
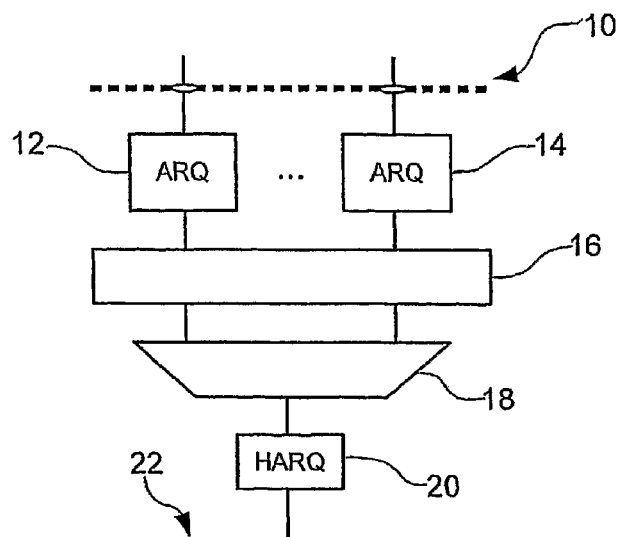
FIG. 1 is a schematic illustration of MAC Architecture with ARQ and HARQ protocols.

Turning now to FIG. 1, there is provided a schematic illustration of the manner in which ARQ and HARQ protocols work together within, for example, MAC E-node B or MAC UE.

As illustrated, there is provided a MAC architecture 10 including a plurality of logical channels 10 which provide for a plurality of ARQ PDUs 12, 14 controlled by means of a priority/scheduling controllers 16 and subsequently delivered to a multiplexer 18.

Once combined by the multiplexer 18, the ARQ PDUs serve to form an HARQ PDU 20 which is delivered on to transport channels 22.

Figure 2A:
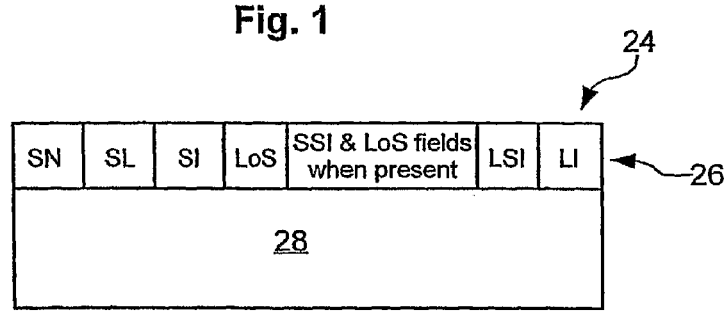
FIGS. 2A and 2B illustrate the PDU frame structure formats for an ARQ PDU and a HARQ PDU respectively.
Figure 2B:
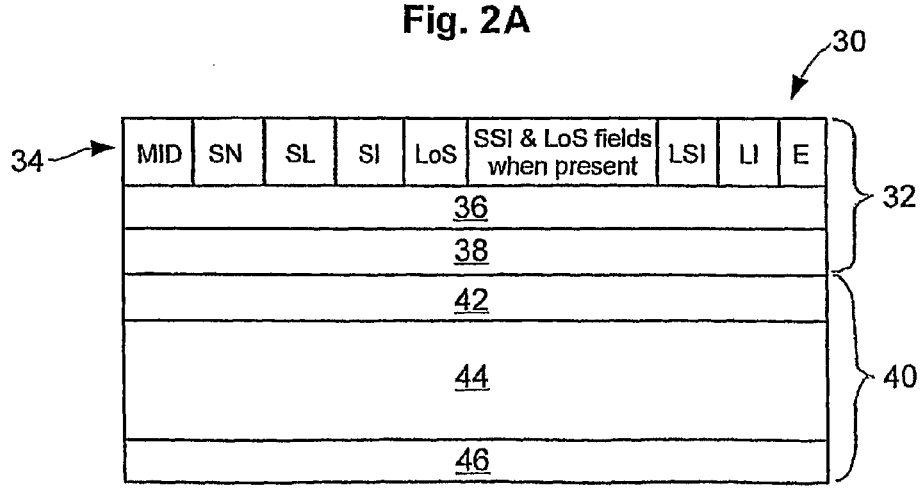

Turning now to FIGS. 2A and 2B, there is illustrated the structure of an ARQ PDU and a HARQ PDU.

With regard to FIG. 2A, an ARQ PDU 24 is illustrated which includes a header 26 having a variety of fields which are discussed further below, and the second portion comprising the data payload 28.

With regard FIG. 2B, the HARQ PDU structure is of course formed from one or more ARQ PDUs and so, as such, includes a HARQ PDU structure 30 comprising respective header fields 32 for a plurality of ARQ PDUs in which a first header field 34 relates to the first ARQ PDU, a second header field 36 relates to a second ARQ PDU field and a third header portion 38 relates to a third ARQ PDU.

After the header fields, they provided a plurality of ARQ PDU data payloads 40 comprising separate payloads 42, 44 and 46 which relate to the headers 32, 36 and 38 respectively. Each of the headers 36, 38 within FIG. 2A share the structure of the first header 34 illustrated in greater detail. The different fields of the header 26 of FIG. 2A and the headers 32 of FIG. 2B are discussed further below.

The MID field is required only if LTE allows multiplexing of more than one IP flow of ARQ PDUs into one HARQ PDU. This field generally has a length of 4 bits.

SN (Sequence Number): The same SN which is used during Ciphering (the layer which performs this is currently undefined for LTE) is extracted and re-used at ARQ and HARQ. The SN field has a length of 12-bits.

SL (Segment and Length Indicator): The 1st bit indicates the presence of segment information (SI, LoS, LSI and SSI) and 2nd bit indicates the presence of the LI field. The SL field has a length of 2-bits.

SI (Segment Index): This provides for an indication of the segment number of the ARQ SDU and has a length of 4-bits.

LoS (Level of Segmentation): The Level of segmentation is always associated with SI or SSI. It has a length of 1-bit and is set to "0", when the actual segment getting transmitted is indicated by the previous SI/SSI field, and set to "1", when the actual segment is getting transmitted is the sub-segment of the previous SI/SSI. The SSI of the actual segment should then be in the next field.

SSI (Sub Segment Indicator): If re-transmission requires segmentation of the previous transmitted ARQ PDU (which is a segment of ARQ SDU) then SSI indicates segment number and has a length of 4-bits.

LSI (Last Segment Indicator: This field follows the LoS (Which is set to "0") field. Also it can help the receiver in re-assembling PDUs in to SDU and has a length of 1-bit. The LSI is set to "1" if it is the last segment, otherwise it is set to "0".

LI (Length Indicator): Indicates the length of ARQ PDU.

As of course will be appreciated in accordance with the invention, an LI is added to an ARQ PDU if it is carrying the last bit of the ARQ SDU.

Further, if there is a concatenation of ARQ PDUs from different ARQ SDUs into one HARQ PDU, then the LI is added to all ARQ PDUs except the last ARQ PDU, if it is not carrying the last bit of ARQ SDU. Of course, if the PDU does not fall under any category mentioned above it does not require an LI field. The LI field typically has a length of 15-bit or 7-bits.

The actual PDU length in bits=((LI*8)−4), this is because a SN of 12-bits, which is not octet-aligned, is extracted from SDU and used as a SN or ARQ and HARQ PDUs.

E: The Extension bit which has a length of 1-bit and which is set to "1" if there is any further header, otherwise it is set to "0".

To illustrate the present invention further, the construction of the header is illustrated below, which serves to show the use of SI, LoS, SSI, LSI and LI fields for each of the four values of the SL field. It should be appreciated that the MID, SN, SL and E bits are always present in each of the headers.

SL: 00
  SI, LoS, SSI, LSI and LI fields do not exist
SL: 01
  LI exists
  SI, SSI, LoS and LSI do not exist
SL: 10
  LI does not exist
  Please see A & B below
SL 11
  LI exists
  Please see A & B below
A. If it is initial transmission of ARQ PDU which is a segment of ARQ SDU
  SI exists
  LoS=0
  LSI follows LoS field
  Segment Level=1
B. If it is Re-transmission
  Previous transmitted ARQ PDU is segmented further in this transmission then
    Segment Level=Segment Level+1
  Previous transmitted ARQ PDU is not segmented then
    Segment Level=Segment Level
  SI exists
  Number of LoS=Segment Level, LoS(1) to LoS(Segment Level−1)=1 and LoS(Segment Level)=0
  Number of SSI=Segment Level−1
  LSI follows LoS(Segment Level)

An embodiment of the method of the present invention is illustrated further below with reference to FIG. 3 which comprises a flow chart serving to indicate, how and when the LI field is added into the header.

Figure 3:
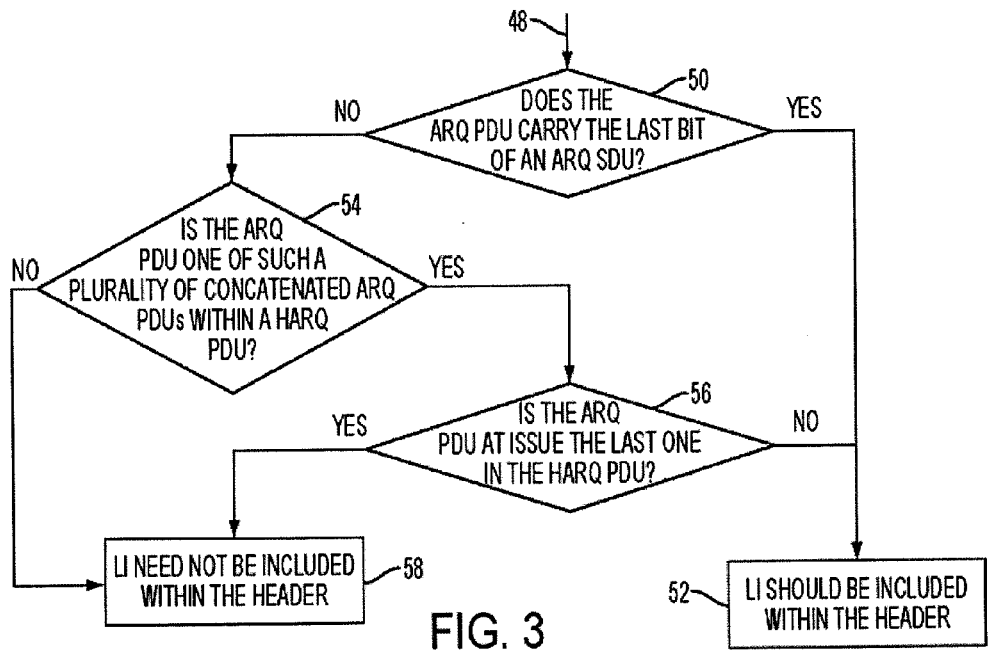
FIG. 3 is a flow diagram illustrating the manner of addition, or omission, of a Length Indicator Field in accordance with an embodiment of the present invention.

Referring to FIG. 3, for each ARQ PDU 48 it is determined at 50 whether or not the ARQ PDU carries the last bit of an ARQ SDU.

As noted above, a plurality of ARQ PDUs can be provided to represent the ARQ SDU, or single ARQ PDU can represent a single ARQ SDU.

If, step 50, it is determined that the ARQ PDU does carry the last bit of the ARQ SDU, then the method proceeds to step 52 where it is determined that the LI should be included within the header.

If, however, at step 50 it is determined that the ARQ PDU does not carry the last bit of the ARQ SDU, then the method proceeds to step 54 where it is then determined whether the ARQ PDU at issue is one of a plurality of concatenated ARQ PDUs within a HARQ PDU.

If, step 54, it is determined that the ARQ PDU is one of such a plurality of concatenated ARQ PDUs within a HARQ PDU, then the method proceeds to step 56 where it is determined whether or not the ARQ PDU at issue is the last one within the HARQ PDU.

If it is determined that step 56 that the ARQ PDU is not the last one in the HARQ PDU, then the method proceeds to step 52 where it is determined that the LI should be included within the header.

If, at step 54 it is determined that the ARQ PDU is not concatenated with other ARQ PDUs within a HARQ PDU; or at step 56 that the ARQ PDU is the last one within the HARQ PDU, then the method proceeds to step 58 where it is determined that a LI need not be included within the header.

As further illustration, different scenarios are now discussed below and which serve to illustrate the manner in which the frame format arising in accordance with the present invention can be employed.

The first scenario comprises the likely most common case and provides a clear indication as to how the message header can be reduced.
ARQ SDU (IPv6 ROHC compressed which contains one speech frame) size=6
(ROHC header)+32 (AMR RTP payload)=38-bytes=304 bits
Time interval: One SDU per very 20 ms
ARQ BLER=0%
HARQBLER=10%
HARQ PDU Size=104 bits
ARQ data to be transmitted=ARQ SDU−ARQ SN=292-bits
Header size for 1st, 2nd and 3rd HARQ PDUs=24 and actual ARQ data to be transmitted is=80=bits
Header size for 4th HARQ PDU=32 bits and actual ARQ data to be transmitted is=52-bits
SDU needs to be segmented in to 4 HARQ PDUs.

Figure 4A:
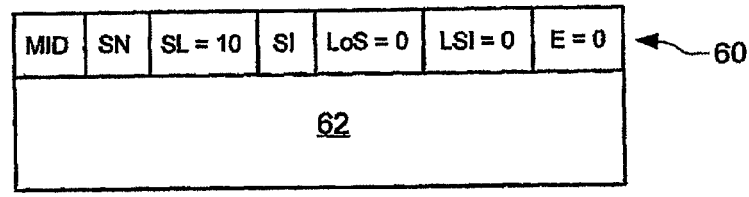
FIGS. 4A and 4B illustrate the structure of HARQ PDUs arising in accordance with an embodiment of the present invention.
Figure 4B:
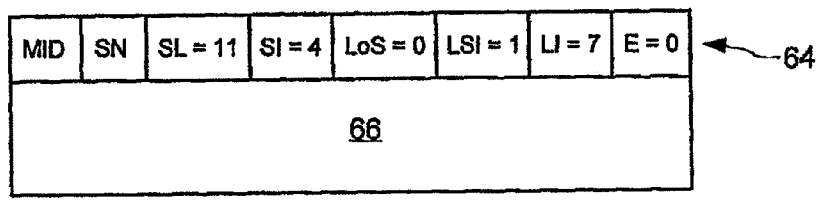

Turning to FIGS. 4A and 4B, there is provided an illustration of the structure of the four HARQ PDUs arising in accordance with this first scenario.

FIG. 4A illustrates the format for the first-third HARQ PDUs where it is appreciated that no LI field is required.

However, with regard to FIG. 4B, is illustrated the 4th HARQ PDU and which includes a LI field within its header.

Through the following comparison, it can be readily appreciated how the present invention can provide for advantageous performance as compared with the current state of the ARQ.

With regard to the number of header bits per ARQ PDU, 32 bits are required within the current art, whereas, with the invention, 24 bits are required for the 1st, 2nd and 3rd HARQ PDUs, and 32 bits is required for the 4th HARQ PDU.

The total number of PDUs required to transmit one ARQ SDU is 5 for the current art, whereas it is only 4 where calculated in relation to the present invention.

Within the current art, the total header overhead is in the region of 160, whereas with the present invention this figures is reduced to in the order of 104 bits.

For the current art, the total number of bits arising from a combination of the total data and the HARQ header is 452 (292+160) for the current art, and 396 (292+104) for the current invention.

With regard to bandwidth values, the current art is seen to occupy a bandwidth of 26.26 kbps, whereas with the present invention, a bandwidth in the order of 21.008 kbps is occupied.

Figure 5A:
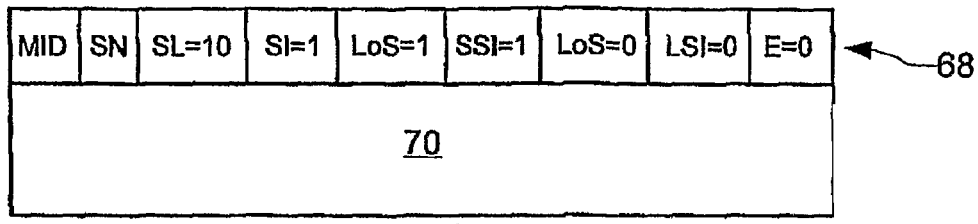
FIGS. 5A and 5B illustrate the structure of HARQ PDUs arising in accordance with another embodiment of the present invention.
Figure 5B:
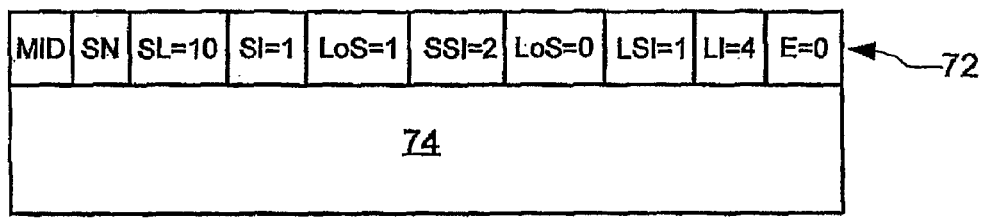

Turning now to FIGS. 5A and 5B, these illustrate HARQ PDU structures for a further scenario involving the re-transmission of the ARQ SDU segment and in which HARQ PDU size has been changed such that the original ARQ PDU can no longer be sent within a single HARQ PDU so as to require further segmentation. That is, the HARQ PDU size is in the order of 80 bits and since it cannot accommodate the original PDU, segmentation is required.

In this manner, ARQ PDU-1 comprises a sub-segment of a 32 bit header and with 48 bits of data, whereas ARQ PDU-2 comprising a 2nd sub-segment having a header 40 bits in size whereas the actual data to be transmitted comprises 28 bits.

FIG. 5A illustrates the HARQ PDU for the 1st sub-segment and which includes the header portion 68 and a data payload portion 70 of the dimensions noted above, whereas FIG. 5B illustrates the HARQ PDU for the 2nd sub-segment having a header 72 which, notably, includes the LI, and also includes a data payload 74 and comprising the number of bits as discussed above. As will be appreciated, the HARQ PDU is not completely filled by the 2nd segment and since there is no further data to transmit, some adding can be required and it is for this reason that the LI serves a purpose in indicating where the actual data ends, and the padding begins.

Of course, it is appreciated that instead of employing the aforementioned padding the HARQ can employ the available free space for any other purpose.

Within this second scenario, it should be appreciated that the occupied bandwidth is the same as that experienced within the current art.

With regard to a third scenario, it is illustrated that the multiplexing of data from different ARQ entities into a single HARQ PDU. However, for simplicity, the relevant number of bits is not illustrated within the diagram.

Figure 6:
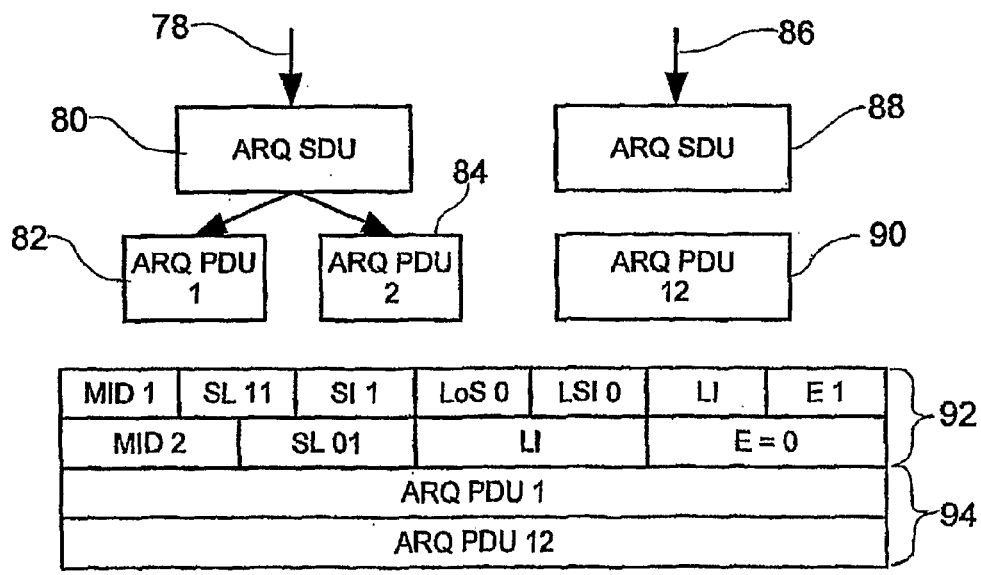
FIG. 6 illustrates the structure and formation of a HARQ PDU from the multiplexing of ARQ PDUs from different ARQ entities.

Thus, with regard to FIG. 6, there is illustrated the multiplexing of a first data flow 78 comprising an ARQ SDU 80 which is segmented into 1st 82 and 2nd 84 ARQ PDUs, and a 2nd flow 86 comprising ARQ SDU 88 which leads to a single ARQ PDU 90.

Once multiplexed, the HARQ PDU accommodates the two ARQ SDUs 80, 88 in the manner illustrated with header regions 92 and PDU payload data 94.

With regard to a fourth scenario, the HARQ PDU size is arranged to change at the time of the 3rd HARQ PDU, and which arises in the middle of SDU transmission.

Figure 7:
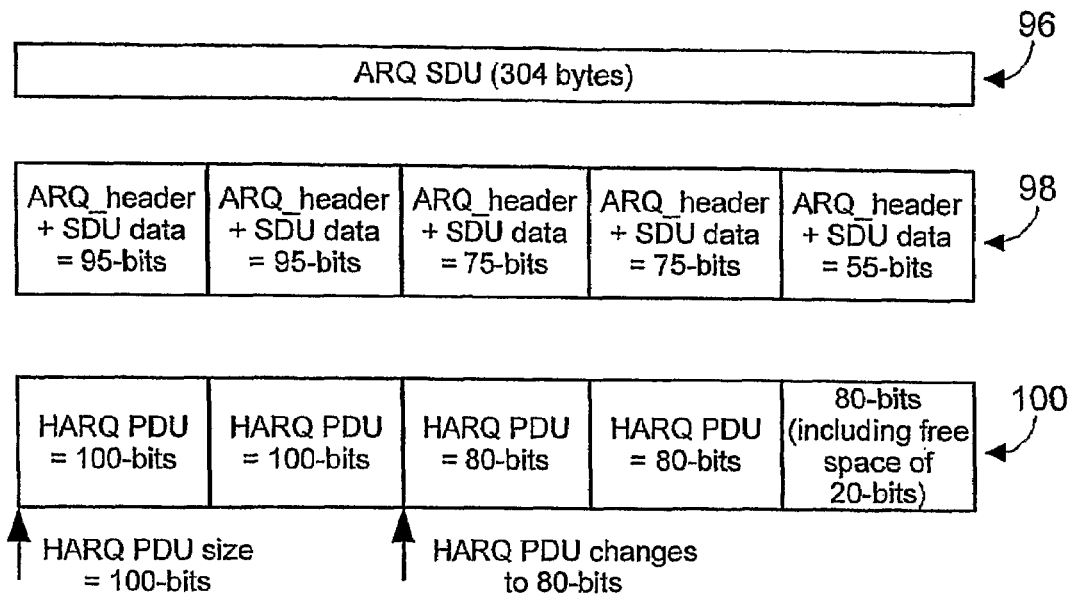
FIG. 7 is an illustration of the formation of HARQ PDUs and ARQ PDUs from an ARQ SDU.

Reference here is made to FIG. 7 which illustrates the ARQ SDU 96, the ARQ PDUs 98 and the HARQ PDUs 100.

It should be appreciated that corresponding values as those arising in the first scenario are employed here and the principle difference is the HARQ PDU size is changed at the 3rd HARQ PDU, so as to transmit one ARQ SDU and five HARQ PDUs.

As illustrated within the ARQ PDUs, the size of the ARQ header and the SDU data is 95 bits until the 3rd HARQ PDU at which time it changes to 75 bits.

Whereas, with regard to the HARQ PDUs 100, the size here is 100 bits until it reduces to 80 bits at the time of the 3rd HARQ PDU.

Thus, from the four scenarios discussed above, it can be appreciated how the present invention compares favourably with the current art with regard to speed of transmission and efficient use of network resources and, further, how the need for re-segmentation or concatenation can be eliminated if there is a change in HARQ PDU size before completion of ARQ SDU transmission.

Through the provision of formats for the ARQ and HARQ PDU which provide for quicker, and more efficient, data throughput the possibility of bringing ARQ and HARQ protocols together within a single physical entity is advantageously realized so as to reduce overall delays for 3GPP LTE transmissions.

The invention claimed is:

1. A method of forming at least one ARQ (Automated Repeat Request) PDU (Protocol Data Unit) from an ARQ SDU (Service Date Unit), the PDU and the SDU being packets to be transmitted in a network, ARQ PDU comprising an ARQ header and a data portion, the method comprising selective addition of a Length Indicator (LI) field to the said ARQ header responsive to the determination of the presence in the ARQ PDU of the last bit of an ARQ SDU, wherein, in a case where a plurality of ARQ PDUs from different ARQ SDUs are formed into one HARQ (Hybrid ARQ) PDU, the LI field is not included in the last ARQ PDU if it is found not to be carrying the last bit of the ARQ SDU and LI field is added to all other ARQ PDUs though they are not carrying last bit of ARQ SDU.

2. A method as claimed in claim 1, wherein the LI field is included as part of the ARQ header if the ARQ PDU is found to be carrying the last bit of the ARQ SDU.

3. A method as claimed in claim 1, wherein if it is determined that the ARQ PDU is not carrying the last bit of the ARQ SDU, the method comprises a step of determining whether or not a plurality of ARQ PDUs are formed from different ARQ SDUs into a common HARQ PDU.

4. A method as claimed in claim 1, wherein the presence of the LI field is indicated by means of a Segment and Length field of the ARQ header.

5. A method as claimed in claim 1, further comprising a step of providing a single Last Segment Indicator per ARQ PDU.

* * * * *